(12) United States Patent
Kim et al.

(10) Patent No.: US 9,136,565 B2
(45) Date of Patent: Sep. 15, 2015

(54) SECONDARY BATTERY

(71) Applicant: Samsung SDI Co., Ltd., Yongin-si, Gyeonggi-do (KR)

(72) Inventors: Cheol-Hong Kim, Yongin-si (KR); Pil-Goo Jun, Yongin-si (KR); Jun-Sub Lee, Yongin-si (KR)

(73) Assignee: Samsung SDI Co., Ltd. (KR)

(*) Notice: Subject to any disclaimer, the term of this patent is extended or adjusted under 35 U.S.C. 154(b) by 238 days.

(21) Appl. No.: 13/767,618

(22) Filed: Feb. 14, 2013

(65) Prior Publication Data
US 2013/0236772 A1 Sep. 12, 2013

Related U.S. Application Data

(60) Provisional application No. 61/608,506, filed on Mar. 8, 2012.

(51) Int. Cl.
| H01M 4/60 | (2006.01) |
| H01M 4/62 | (2006.01) |
| H01M 10/42 | (2006.01) |
| H01M 4/04 | (2006.01) |
| H01M 4/13 | (2010.01) |
| H01M 4/139 | (2010.01) |
| H01M 4/02 | (2006.01) |

(52) U.S. Cl.
CPC ............ *H01M 10/4235* (2013.01); *H01M 4/04* (2013.01); *H01M 4/13* (2013.01); *H01M 4/139* (2013.01); *H01M 4/02* (2013.01); *Y02E 60/122* (2013.01); *Y10T 29/49108* (2015.01)

(58) Field of Classification Search
CPC ........... H01M 4/00; H01M 4/60; H01M 4/62; H01M 10/4235
USPC .................................................. 429/211, 212
See application file for complete search history.

(56) References Cited

U.S. PATENT DOCUMENTS

2004/0202928 A1 10/2004 Miyamoto et al.
2006/0127774 A1 6/2006 Kim et al.

FOREIGN PATENT DOCUMENTS

| KR | 10-1998-060807 | 10/1998 |
| KR | 10-2000-0043844 | 7/2000 |
| KR | 20-2000-0018834 | 10/2000 |
| KR | 10-2004-0076831 | 9/2004 |

(Continued)

OTHER PUBLICATIONS

Office Action dated Jun. 27, 2014 in Korean Priority Application No. 10-2013-0024149.

*Primary Examiner* — Kenneth Douyette
*Assistant Examiner* — James Lee
(74) *Attorney, Agent, or Firm* — Knobbe Martens Olson & Bear LLP

(57) ABSTRACT

A secondary battery includes an electrode assembly including a first electrode plate, a second electrode plate and a separator interposed therebetween; and a battery case in which the electrode assembly is accommodated. The first electrode plate is composed of a first coated portion having a first active material coated on a first substrate and a first non-coated portion. The second electrode plate is composed of a second coated portion having a second active material coated on a second substrate and a second non-coated portion. In the secondary battery, the section of a boundary portion between the first or second coated portion and the first or second non-coated portion is inclined.

5 Claims, 4 Drawing Sheets

(56) References Cited

FOREIGN PATENT DOCUMENTS

| | | |
|---|---|---|
| KR | 10-2006-0037847 | 5/2006 |
| KR | 10-0717761 | 5/2007 |
| KR | 10-2007-0097148 | 10/2007 |

SECONDARY BATTERY

CROSS-REFERENCE TO RELATED APPLICATIONS

This application claims priority to and the benefit of U.S. Provisional Application No. 61/608,506, filed on Mar. 8, 2012, the entire content of which is incorporated herein by reference.

BACKGROUND

1. Field

An aspect of the present disclosure relates to an electrode assembly and a secondary battery including the electrode assembly, and more particularly, to a secondary battery having improved safety and reliability.

2. Description of the Related Technology

In general, secondary batteries are batteries capable of being repeatedly charged and discharged. With the development of electricity, as well as of electronic, communication and computer industries, demands on secondary batteries have recently been increased as power sources of portable devices. Studies on secondary batteries have been conducted in many fields so as to improve performance and safety according to the type and quantity of the secondary batteries used.

Requirements of small-sized and high-capacity secondary batteries are increased. Particularly, the safety of the high-capacity secondary batteries may be problematic. When the high-capacity secondary batteries are used as power sources of external electronic devices, the secondary batteries may cause a risk due to the synergy effect of the electronic devices.

SUMMARY OF CERTAIN INVENTIVE ASPECTS

Embodiments provide a secondary battery having improved safety using a new method of manufacturing the secondary battery. Embodiments also provide a secondary battery having improved process efficiency by simplifying a method of manufacturing the secondary battery.

According to an aspect of the present invention, there is provided a secondary battery including: an electrode assembly including a first electrode plate composed of a first coated portion having a first active material coated on a first substrate and a first non-coated portion, a second electrode plate composed of a second coated portion having a second active material coated on a second substrate and a second non-coated portion, and a separator interposed between the first and second electrode plates; and a battery case accommodating the electrode assembly, wherein a section of at least one of the first boundary portion and the second boundary portion is inclined from the first or second coated portion to the first non-coated portion when viewed in a direction perpendicular to the first or second electrode plate.

The first and second boundary portions may each include a waveform.

A fixing material may be provided on the first and second boundary portions.

The fixing material may be provided to cover the boundary portion in the waveform.

The first boundary portion may include a sequential stacking of the first active material and the fixing material, and the second boundary portion may include a sequential stacking of the second active material and the fixing material.

The first and second boundary portions may be formed of one or more layers in a laminate type.

The the first boundary portion may include a sequential stacking of the first active material, a mixed layer and the fixing material, and the second boundary portion may include a sequential stacking of the second active material, a mixed layer and the fixing material.

The mixed layer may include a mixture of the fixing material and one of the first or the second active material.

The fixing material may include at least one of polypropylene, polyethylene terephthalate, polyethylene naphthalate and polyimide.

As described above, according to the present invention, it is possible to provide a secondary battery having improved safety using a new method of manufacturing the secondary battery.

Further, it is possible to provide a secondary battery having improved process efficiency by simplifying a method of manufacturing the secondary battery.

According to an aspect of the present invention, a method of manufacturing an electrode plate includes applying, using a coater, an active material on at least a portion of a surface of an electrode plate, thereby defining a coated portion and an uncoated portion on the surface of the electrode plate, wherein the coated portion is separated from the uncoated portion by a boundary region on the electrode plate; applying, using the coater and without removing the electrode plate from the coater, a fixing material on the boundary region on the electrode plate; and where the coater comprises a first tank connected to a first slot, and a second tank connected to a second slot, wherein the active material is inserted into the first tank in a slurry state, and the fixing material is inserted into the second tank in a melted state.

The applying of the active material and the applying of the fixing material may be performed intermittently on a substrate, and the method may further include slitting the substrate into individual electrode plates.

A diameter of the first slot may be greater than a diameter of the second slot.

The first slot and the second slot may be spaced apart by a predetermined interval.

The first slot and the second slot of the coater may be configured to be independently controlled.

Applying, using the coater, the fixing material on the boundary region may include applying the fixing material after the applied active material in the slurry state is dried.

The method may further include applying, using the coater, a mixed material on the boundary region.

The mixed material may include a mixture of the active material and the fixing material.

Applying, using the coater, the mixed material on the boundary region may include applying the fixing material while the active material is still in the slurry state.

According to an aspect of the present invention, a method of manufacturing a secondary battery includes: providing a battery case; manufacturing an electrode assembly comprising: manufacturing a positive electrode plate using the method described above, where a section of the boundary region is inclined from the coated portion to the uncoated portion when viewed in a direction perpendicular to the positive electrode plate; manufacturing a negative electrode plate using the method described above, where a section of the boundary region is inclined from the coated portion to the uncoated portion when viewed in a direction perpendicular to the negative electrode plate; and providing a separator interposed between the positive and negative electrode plates.

DETAILED DESCRIPTION OF CERTAIN INVENTIVE ASPECTS

Figure 1:
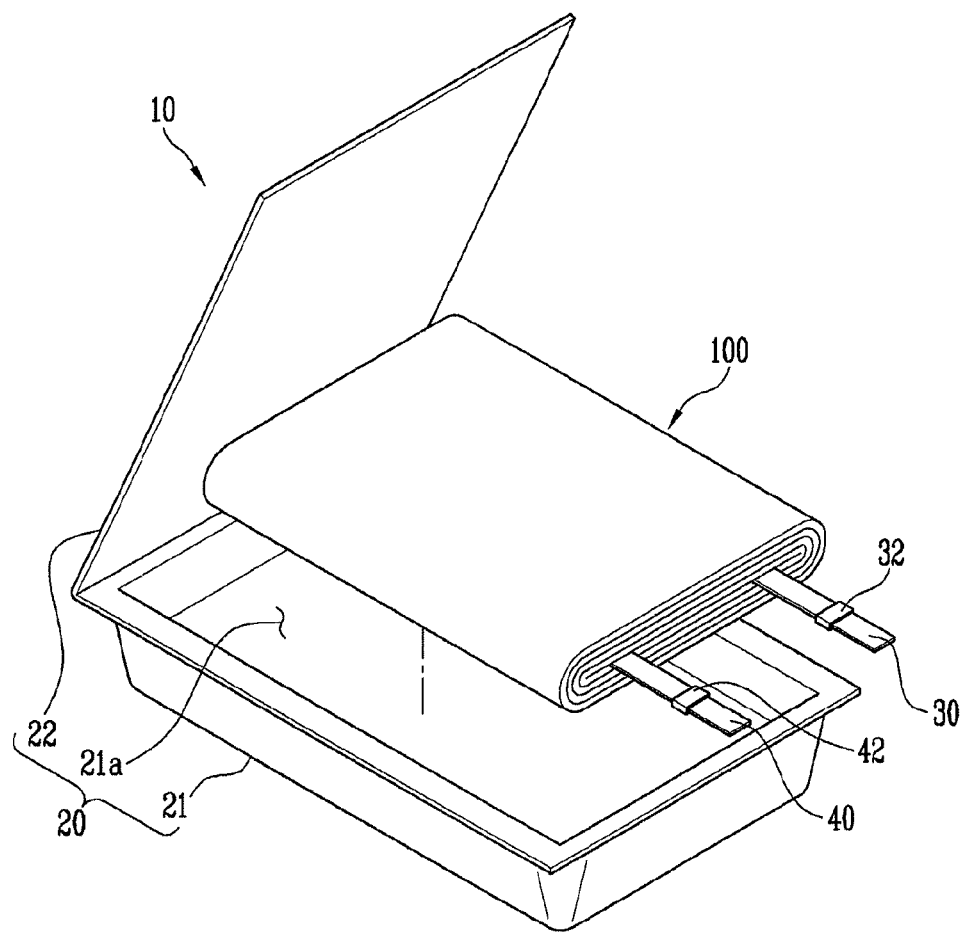
FIG. 1 is an exploded perspective view of a secondary battery according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals generally refer to like elements.

Figure 2:
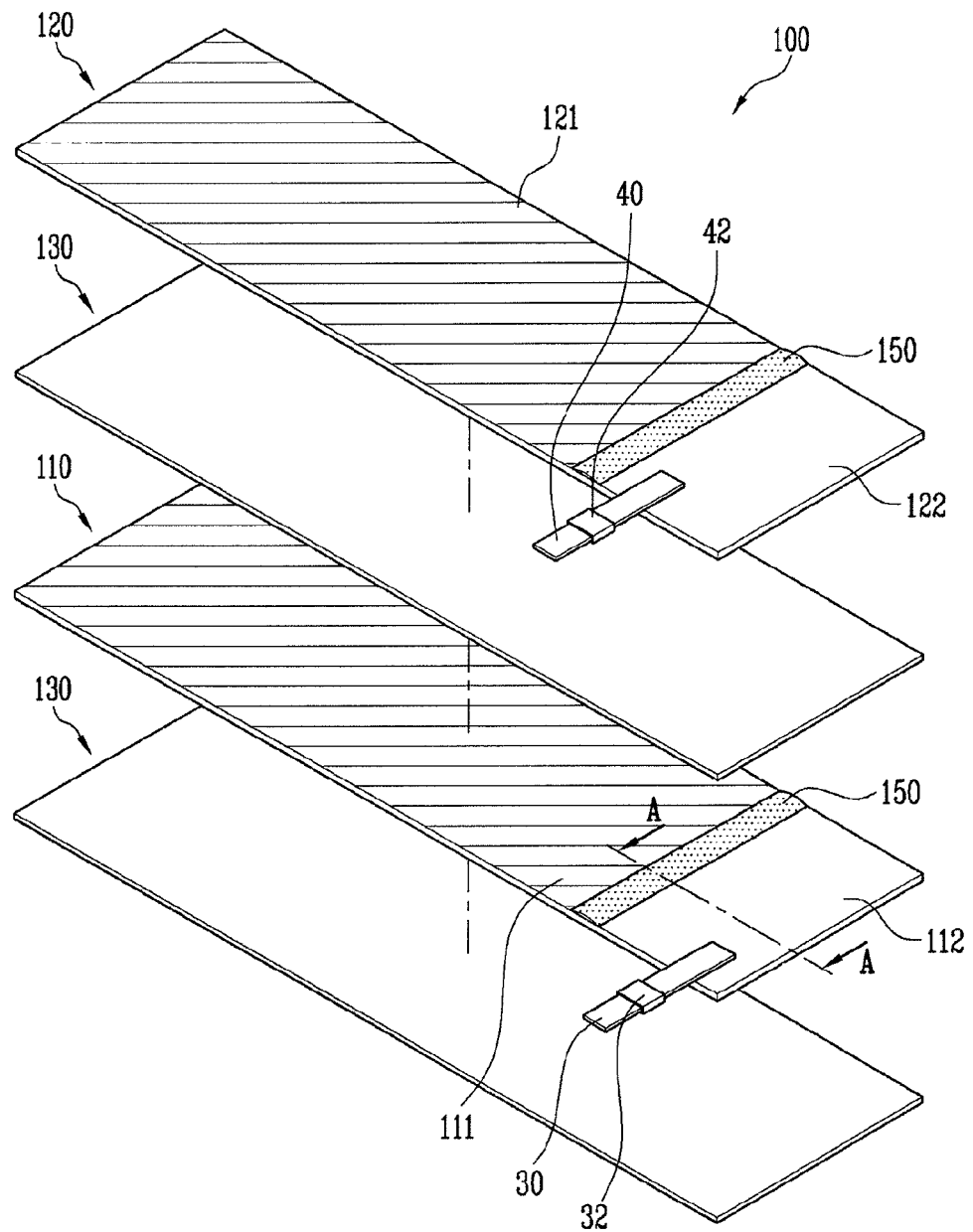
FIG. 2 is an exploded perspective view of an electrode assembly of FIG. 1.

FIG. 1 is an exploded perspective view of a secondary battery according to an embodiment of the present invention. FIG. 2 is an exploded perspective view of an electrode assembly of FIG. 1.

Referring to FIGS. 1 and 2, the secondary battery 10 includes an electrode assembly 100 composed of a first electrode plate 110, a second electrode plate 120 and a separator 130 and a battery case 20 in which the electrode assembly 100 is accommodated. The first electrode plate 110 is composed of a first coated portion 111 having a first active material coated on a first substrate 110a and a first non-coated portion 112 not having the first active material coated on the first substrate 110a. The second electrode plate 120 faces the first electrode plate 110, and is composed of a second coated portion 121 having a second active material coated on a second substrate 120a and a second non-coated portion 122 not having the second active material coated on the second substrate 120a. The separator 130 is interposed between the first and second electrode plates 110 and 120. A boundary section between one of the first or second coated portion 111 or 121, and the respective first or second non-coated portion 112 or 122, may be inclined, as described below.

The electrode assembly 100 may be manufactured by winding or stacking the first electrode plate 110, the second electrode plate 120 and the separator 130 interposed therebetween. The secondary battery 10 is manufactured by accommodating the electrode assembly 100 and an electrolyte in the battery case 20.

The first electrode plate 110 may be composed of the first coated portion 111 formed by coating the first active material on the first substrate 110a and the first non-coated portion 112 where the first substrate 110a is exposed. For example, the first electrode plate 110 may be a positive electrode plate, and the first active material may be made of a positive electrode active material containing lithium.

The second electrode plate 120 may be composed of the second coated portion 121 formed by coating the second active material on the second substrate 120a and the second non-coated portion 122 where the second substrate 120a is exposed. For example, the second electrode plate 120 may be a negative electrode plate, and the second active material may be made of a negative electrode active material containing carbon.

The first or second substrate 110a or 120a acts as a current collector, and may include a thin-film metal. First and second electrode tabs 30 and 40 may be provided to the respective first and second non-coating portions 112 and 122 of the first and second electrode plates 110 and 120 through welding, etc. The first and second electrode plates 110 and 120 generate the flow of current or electrons through a reaction with the electrolyte, and the current and electrons are transferred to the outside of the electrode assembly 100 through the first and second electrode tabs 30 and 40.

The electrolyte may be provided to facilitate the movement of current or electric charges between the first and second electrode plates 110 and 120. The electrolyte may include a lithium salt acting as a supply source of lithium ions, and a non-aqueous organic solvent acting as a medium through which ions participating in an electrochemical reaction can move.

The battery case 20 may include a main body 21 having a space 21a a provided therein, and a cover 22. The electrode assembly 100 and the electrolyte are accommodated in the main body 21 of the battery case 20, and the main body 21 is sealed with the cover 22 so as to prevent the electrode assembly 100 and the electrolyte from coming off from the battery case 20. The main body 21 is stably sealed by the cover 22 by thermally bonding edges of the main body 21 and the cover 22. The first and second electrode tabs 30 and 40 may be provided to protrude to the outside of the battery case 20, and tab films 32 and 42 provided to the first and second electrode tabs 30 and 40 are mounted on portions of the battery case 20 to be thermally bonded, respectively. Although the battery case 20 has been illustrated as a pouch-type battery case in this embodiment, the present invention is not limited thereto. Various battery cases such as prism-type and cylinder-type battery cases may be used as the battery case 20.

Figure 3:
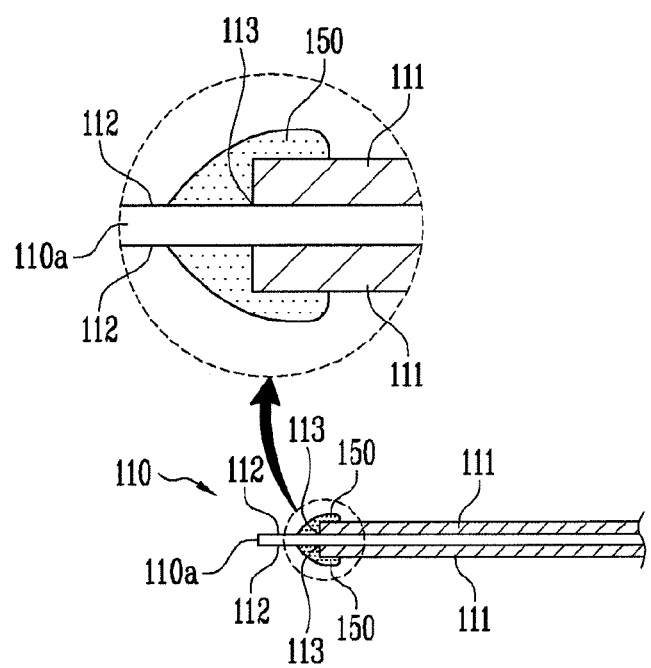
FIG. 3 is a sectional view taken along line A-A of a first electrode plate shown in FIG. 2.

FIG. 3 is a sectional view taken along line A-A of the first electrode plate shown in FIG. 2.

Referring to FIG. 3, a first or second boundary portion 113 is formed between the first or second coated portion 111 or 121 and the first or second non-coated portion 112 or 122, and a fixing material 150 may be formed on the first or second boundary portion 113. At least one portion of the boundary portion between the one of the first or second coated portion 111 or 121, and the corresponding first or second non-coated portion 112 or 122 may be inclined and include a waveform, and the fixing material 150 may be provided to cover the boundary portion.

The first or second boundary portion 113 may be provided in a laminate type by sequentially stacking the first or second active material and the fixing material 150 on the first or second substrate 110a or 120a. The first or second boundary portion 113 may be formed of one or more layers. For example, the fixing material 150 may include one or more of polypropylene, polyethylene terephthalate, polyethylene naphthalate and polyimide.

Hereinafter, the first boundary portion 113 between the first coating portion 111 and the first non-coated portion 112 in the first electrode plate 110 will be described for convenience of illustration. Features for the first coating portion 111, the first non-coated portion 112 and the fixing material 150 can be similarly applied to the second electrode plate 120.

Figure 4:
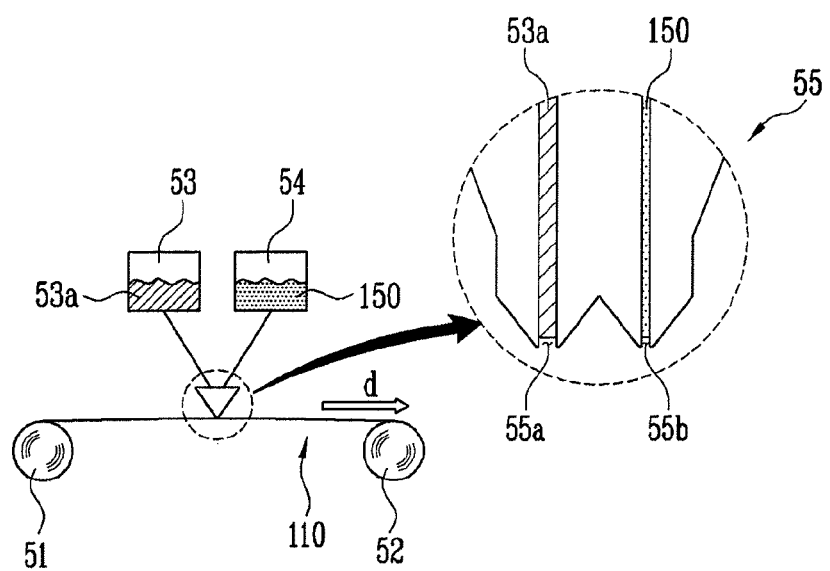
FIG. 4 is a view schematically showing a coater for coating a first or second electrode plate shown in FIG. 2.
Figure 5:
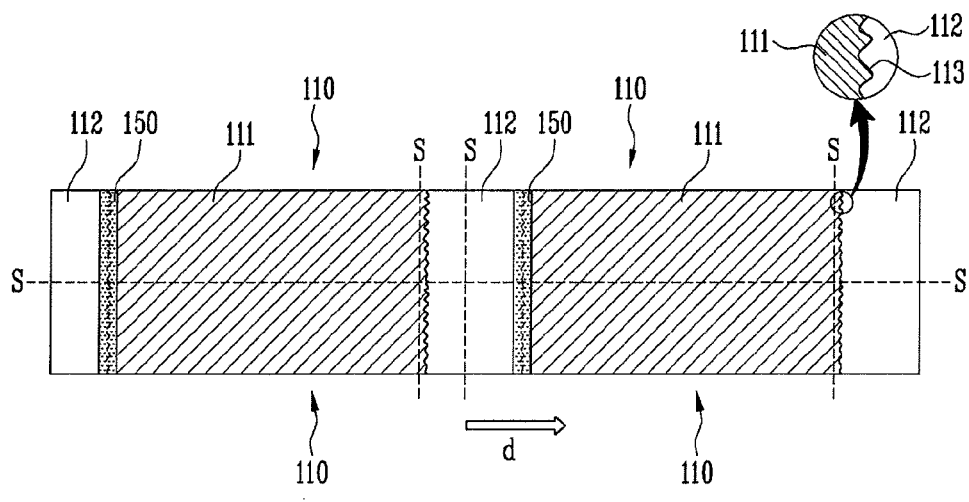
FIG. 5 is a plan view showing a first electrode plate manufactured by the coater of FIG. 4.

FIG. 4 is a view schematically showing a coater for coating the first or second electrode plate shown in FIG. 2. FIG. 5 is a plan view showing a first electrode plate manufactured by the coater of FIG. 4.

Referring to FIGS. 4 and 5, the first electrode plate 110 may be manufactured by coating a first active material formed in a slurry state on a first substrate using a coater 50 and then slitting the first substrate. For example, the coater 50 may include a pair of rolls 51 and 52 providing the first substrate, first and second tanks 53 and 54, and a complex slot die 55 connected to the first and second tanks 53 and 54 so as to directly face the first substrate. The coater 50 may further include a back-up roll (not shown) provided between the pair of rolls 51 and 52. In this case, the back-up roll is provided to contact a bottom surface opposite to the surface of the first substrate, on which the first active material is coated, thereby supporting the first substrate. A first active material 53a in a slurry state is provided in the first tank 53, and a fixing material 150 in a melted state is provided in the second tank 54. The first active material 53a in the slurry state and the fixing material 150 in the melted state are transferred to the complex slot die 55 through a connection pipe, etc.

The complex slot die 55 includes a first slot 55a and a second slot 55b, and the first and second slots 55a and 55b may be provided to be spaced apart from each other at a predetermined interval. For example, the first active material 53a is discharged to the first slot 55a, and the fixing material 150 is discharged to the second slot 55b. The diameter of the first slot 55a may be provided to be greater than that of the second slot 55b.

The complex slot die 55 is provided adjacent on the first substrate, and the first active material 53a or the fixing material 150 is coated while the first substrate advances in a first direction d. In this case, the first and second slots 55a and 55b can be controlled to be individually opened/closed. Thus, the discharge amount or discharge position of the first active material 53a or the fixing material 150 can be freely controlled in the complex slot die 55.

The first active material 53a is intermittently coated on the first substrate, and the first electrode plate 110 is composed of the first coated portion 111 having the first active material 53a coated on the first substrate and the first non-coated portion 112 not having the first active material 53a coated on the first substrate. The first boundary portion 113 that is a boundary portion between the first coated portion 111 and the first non-coated portion 112 may be provided to have a waveform. For example, since the first active material 53a is in a slurry state having high viscosity before being dried, the first boundary portion 113 that a portion at which the coating of the first active material 53a is started or ended has a waveform due to the attraction of the first active material 53a, caused by the viscosity between the first active material 53a and the first substrate and the interval between the first slot 55a and the first substrate. The fixing material 150 discharged through the second slot 55b may be coated to cover the first boundary portion 113.

The first electrode plate 110 before a slitting operation S is performed is schematically shown in FIG. 5. The first electrode plate 110 is manufactured by intermittently coating the first active material 53a on the wide sheet-shaped first substrate and performing the slitting operation S of the first substrate several times.

The first active material provided at the first boundary portion in the first coated portion may be easily separated from the first electrode plate.

The first active material which is separated may contact the second electrode plate having a different polarity from the first electrode plate. Therefore, a short circuit, or the like may be caused, or the performance of the secondary battery may be degraded due to the contamination of the electrolyte. In embodiments of the secondary battery, the fixing material 150 is provided on the first boundary portion 113. The fixing material 150 is provided after the first active material 53a in the slurry state is dried. Thus, the fixing material 150 can prevent the separation of the first active material 53a by fixing the first active material 53a at the first boundary portion 113. The fixing material 150 may be provided to cover the first boundary portion 113 after the first active material 53a is dried. In this case, the section of the first boundary portion 113 may be inclined so that the inclination of the section of the first boundary portion 113 increases as the section of the first boundary portion 113 approaches from the first non-coated portion 112 to the first coating layer 111.

Hereinafter, another embodiment of the present invention will be described with reference to FIG. 6. Contents described in this embodiment, except the following contents, are similar to those described in the embodiment shown in FIGS. 1 to 5, and therefore, their detailed descriptions will be omitted.

Figure 6:
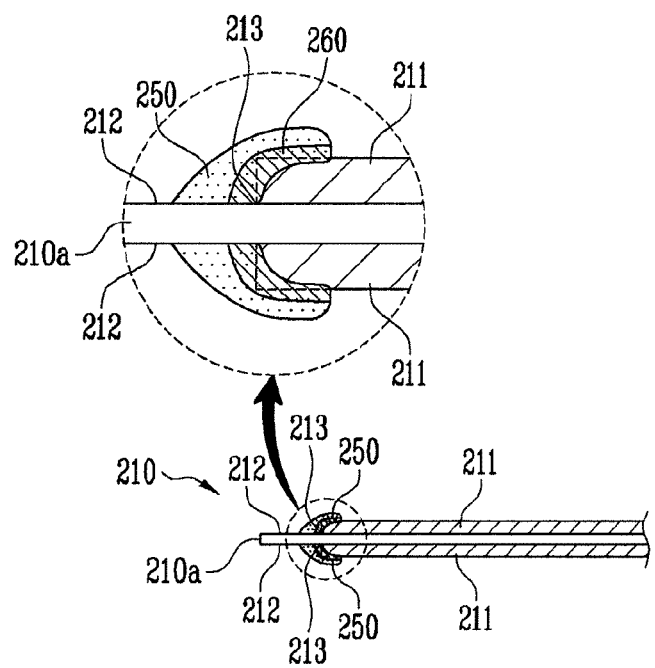
FIG. 6 is a sectional view of a first electrode plate according to another embodiment of the present invention.

FIG. 6 is a sectional view of a first electrode plate according to another embodiment of the present invention. Referring to FIG. 6, the first electrode plate 210 may be composed of a first coating layer having a first active material coated on a first substrate 210a and a first non-coated portion 212 not having the first active material coated on the first substrate 210a. A first boundary portion 213 may be provided between the first coating layer 211 and the first non-coated portion 212. The first active material and a fixing material 250 may be sequentially stacked in a laminate type on the first boundary portion 213. A mixed layer 260 may be further provided between the first active material and the fixing material 250. The mixed layer 260 may be made of a mixture of the first active material and the fixing material 250. The first active material, the mixed layer 260 and the fixing material 250 are sequentially stacked in the laminate type on the first substrate 210a. The section of the stacked structure may be provided to be inclined.

When the first electrode plate 210 is manufactured using a coater, the first active material in a slurry state and the melted fixing material 250 may be coated through consecutive processes. In a case in which the fixing material 250 is coated on the first boundary portion 213 before the first active material is completely dried, the mixed layer 260 may be provided beneath the fixing material 250. For example, the mixed layer 260 may be formed by allowing a portion of the melted fixing material 250 to be flowed into the surface of the first active material of which portion exists in the slurry state. The mixed layer 260 may be formed in the state in which the fixing material 250 and the first active material are mixed. In this case, the fixing material 250 formed by drying only the melted fixing material 250 is provided on the mixed layer 260, and the section of the first boundary portion 213 may be provided to be inclined.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A secondary battery including:
an electrode assembly including:

a first electrode plate composed of a first coated portion having a first active material coated on a first substrate and a first non-coated portion, wherein the first coated portion and the first non-coated portion are separated by a first boundary portion, a second electrode plate composed of a second coated portion having a second active material coated on a second substrate and a second non-coated portion, wherein the second coated portion and the second non-coated portion are separated by a second boundary portion, and a separator interposed between the first and second electrode plates; and a battery case accommodating the electrode assembly, wherein a section of at least one of the first boundary portion and the second boundary portion is inclined from the first or second coated portion to the first non-coated portion when viewed in a direction perpendicular to the first or second electrode plate, wherein the first boundary portion comprises a sequential stacking of the first active material, a first mixed layer and a fixing material, and the second boundary portion comprises a sequential stacking of the second active material, a second mixed layer and the fixing material, wherein the first mixed layer comprises a mixture of the fixing material and the first active material, and wherein the second mixed layer comprises a mixture of the fixing material and the second active material.

2. The secondary battery of claim 1, wherein the first and second boundary portions each include a waveform.

3. The secondary battery of claim 2, wherein the fixing material is provided to cover the first and second boundary portions formed in the respective waveforms.

4. The secondary battery of claim 3, the first and second boundary portions are formed of one or more layers provided in a laminate type.

5. The secondary battery of claim 1, wherein the fixing material comprises at least one of polypropylene, polyethylene terephthalate, polyethylene naphthalate and polyimide.

* * * * *